(12) United States Patent
Hattori et al.

(10) Patent No.: US 8,254,057 B1
(45) Date of Patent: Aug. 28, 2012

(54) DETECTING WEDGE ANGLE WITH A THIRD ELECTRIC LAPPING GUIDE (ELG) DURING MANUFACTURE OF A MAGNETIC HEAD

(75) Inventors: Manabu Hattori, Odawara (JP); Takateru Seki, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 13/369,199

(22) Filed: Feb. 8, 2012

(51) Int. Cl.
G11B 5/127 (2006.01)
(52) U.S. Cl. ...................................... 360/110
(58) Field of Classification Search .......... 360/123.37, 360/324, 245.3, 244, 123.01, 234.3
See application file for complete search history.

(56) References Cited

U.S. PATENT DOCUMENTS

| | | | |
|---|---|---|---|
| 5,465,186 A * | 11/1995 | Bajorek et al. ........... | 360/323 |
| 6,551,173 B2 | 4/2003 | Boutaghou | |
| 6,884,148 B1 | 4/2005 | Dovek et al. | |
| 7,014,530 B2 | 3/2006 | Kasiraj et al. | |
| 7,551,406 B1 | 6/2009 | Thomas et al. | |
| 7,634,850 B2 | 12/2009 | Tanaka | |
| 7,681,303 B2 | 3/2010 | Kondo et al. | |
| 7,861,400 B2 | 1/2011 | Lille | |
| 8,015,692 B1 * | 9/2011 | Zhang et al. ............ | 29/603.14 |
| 2006/0028770 A1 | 2/2006 | Etoh et al. | |
| 2006/0168798 A1 | 8/2006 | Naka | |
| 2007/0070543 A1 | 3/2007 | Gunder et al. | |
| 2009/0081481 A1 | 3/2009 | Fujii | |
| 2009/0116149 A1 | 5/2009 | Fujii et al. | |

FOREIGN PATENT DOCUMENTS

| | | |
|---|---|---|
| JP | 2005/317069 | 10/2005 |
| JP | 2006/048806 | 2/2006 |
| JP | 2006/331562 A | 12/2006 |
| WO | 2010/119585 A1 | 10/2010 |

* cited by examiner

*Primary Examiner* — Allen Cao
(74) *Attorney, Agent, or Firm* — Zilka-Kotab, PC

(57) ABSTRACT

In one embodiment, a magnetic head includes a read element, a write element, a write upper shield positioned in a down-track direction from the write element, a first resistance detecting element positioned on an air bearing surface (ABS) side in a first cross-track direction from the read element, a second resistance detecting element positioned on the ABS side in a second cross-track direction from the write element, a third resistance detecting element positioned on the ABS side in a third cross-track direction from the write upper shield, a protective film positioned near the read and write elements, first, second, and third resistance detecting elements, and the write upper shield, and terminals positioned on an end surface side of the magnetic head, the terminals being coupled to the write element, the read element, the first resistance detecting element, the second resistance detecting element, and the third resistance detecting element.

17 Claims, 14 Drawing Sheets

Heater

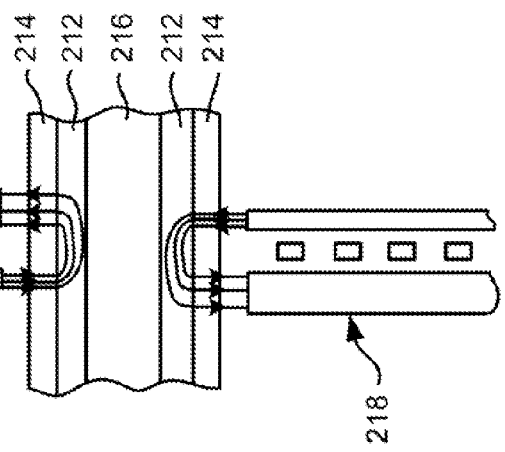
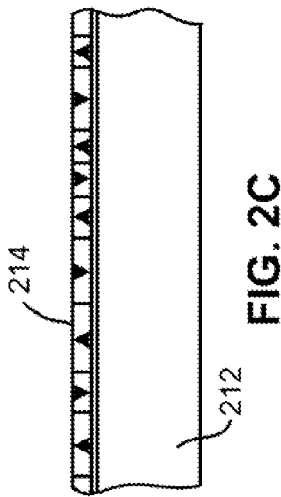
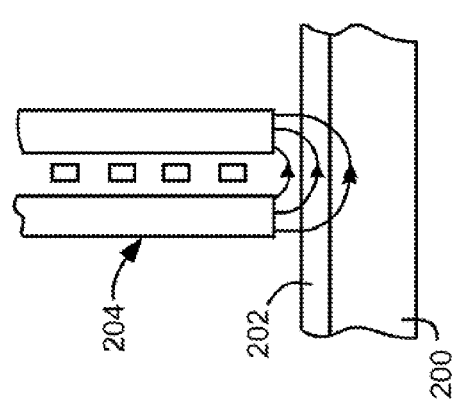

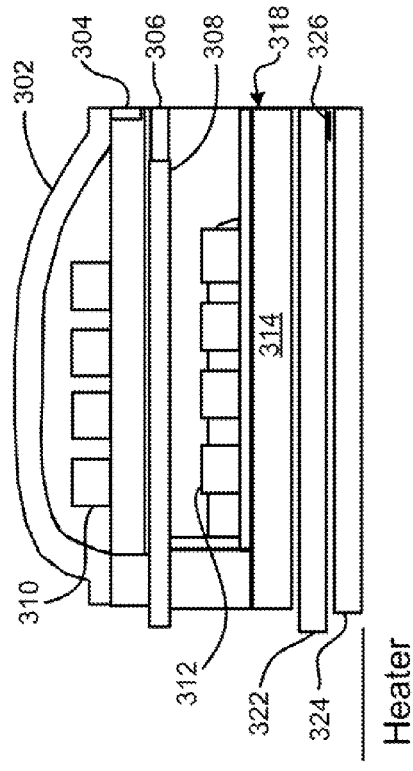
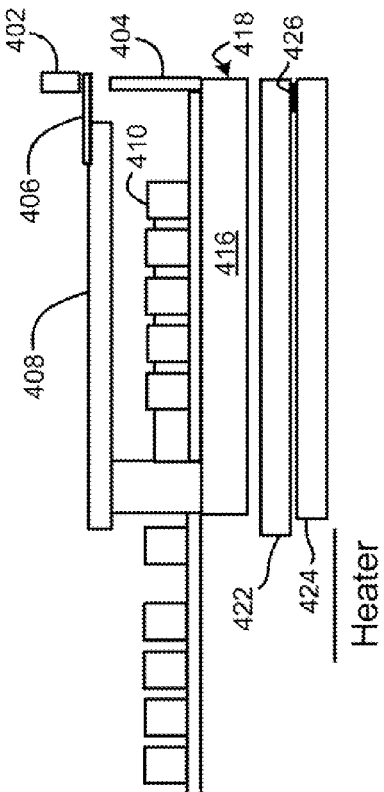
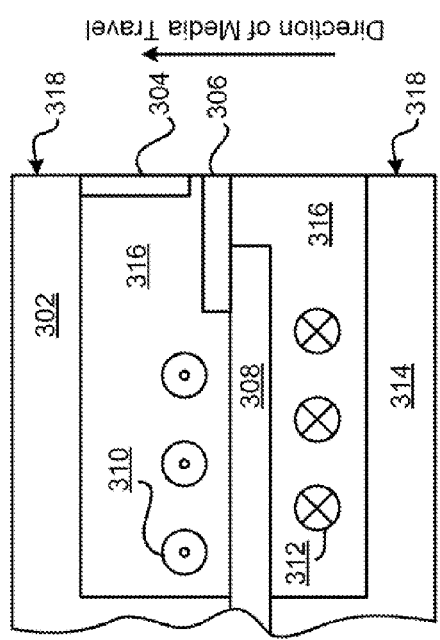
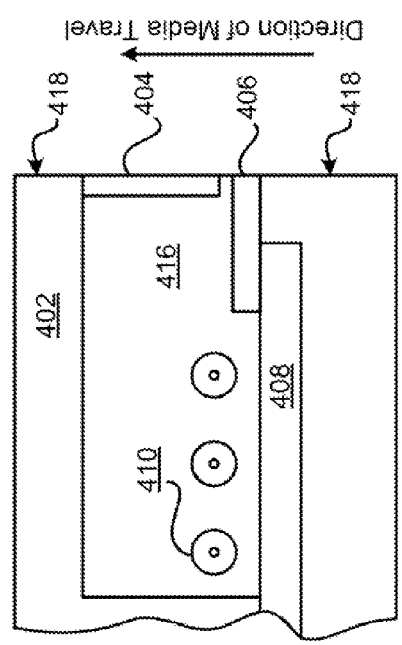
FIG. 3B
FIG. 4B
FIG. 3A
FIG. 4A

DETECTING WEDGE ANGLE WITH A THIRD ELECTRIC LAPPING GUIDE (ELG) DURING MANUFACTURE OF A MAGNETIC HEAD

FIELD OF THE INVENTION

The present invention relates to manufacturing magnetic heads, and more particularly, to using a third ELG to detect wedge angle during manufacture of a magnetic head.

BACKGROUND

Due in part to advances in manufacturing of hard disk drives (HDDs), such as higher recording densities and lower costs, the HDD has spread from an external recording device for a large-scale computer to playing a major role in digital information recording media centered in the information technology (IT) field. As shown in FIG. 5, a HDD is constructed from a magnetic disk 1 for recording magnetic information and a magnetic head slider 3 installed at the tip of a gimbal 2. In this structure, magnetic information is read from and written to the magnetic disk 1 while the magnetic head slider 3 is flying just barely above the recording medium on the order of nanometers above the magnetic disk 1 being rotated by a spindle motor.

To achieve higher recording densities, the recording area per bit on the magnetic disk 1 must be reduced, and as a result, perpendicular magnetic recording methods for implementing this become practical. In order to improve the recording density in perpendicular magnetic recording methods, in addition to high precision finishing of the element height of a read element embedded in the magnetic head slider 3, the element height of the write element must be finished with a high degree of precision. In addition to a resistance detecting element for detecting the element height for use by the read element, a resistance detecting element for detecting the element height for use by the write element may also be formed according to some conventional methods. Technologies are also being developed to conduct high precision finishing of the element height of the write element based on the element heights derived from the resistance values of the resistance detecting elements described above in the air bearing surface polishing process.

SUMMARY

In one embodiment, a magnetic head includes a read element, a write element, a write upper shield positioned in a downtrack direction from the write element, a first resistance detecting element positioned on an air bearing surface (ABS) side in a first cross-track direction from the read element, a second resistance detecting element positioned on the ABS side in a second cross-track direction from the write element, a third resistance detecting element positioned on the ABS side in a third cross-track direction from the write upper shield, a protective film positioned near the read element, the write element, the write upper shield, the first resistance detecting element, the second resistance detecting element, and the third resistance detecting element, and terminals positioned on an end surface side of the magnetic head, the terminals being coupled to the write element, the read element, the first resistance detecting element, the second resistance detecting element, and the third resistance detecting element.

According to another embodiment, a method for forming a magnetic head includes forming a read element, forming a write element, forming a write upper shield, forming a first resistance detecting element near the read element in a first cross-track direction from the read element, forming a second resistance detecting element near the write element in a second cross-track direction from the write element, forming a third resistance detecting element near the write upper shield in a third cross-track direction from the write upper shield, forming a protective film above the read element, the write element, the write upper shield, the first resistance detecting element, the second resistance detecting element, and the third resistance detecting element, and coupling the write element, the read element, the first resistance detecting element, the second resistance detecting element, and the third resistance detecting element to terminals which are positioned on an end surface of the magnetic head.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic head includes a read element, a write element, a write upper shield positioned in a downtrack direction from the write element, a first resistance detecting element positioned on an air bearing surface (ABS) side in a first cross-track direction from the read element, a second resistance detecting element positioned on the ABS side in a second cross-track direction from the write element, a third resistance detecting element positioned on the ABS side in a third cross-track direction from the write upper shield, a protective film positioned near the read element, the write element, the write upper shield, the first resistance detecting element, the second resistance detecting element, and the third resistance detecting element, and terminals positioned on an end surface side of the magnetic head, the terminals being coupled to the write element, the read element, the first resistance detecting element, the second resistance detecting element, and the third resistance detecting element.

According to another general embodiment, a method for forming a magnetic head includes forming a read element, forming a write element, forming a write upper shield, forming a first resistance detecting element near the read element in a first cross-track direction from the read element, forming a second resistance detecting element near the write element in a second cross-track direction from the write element, forming a third resistance detecting element near the write upper shield in a third cross-track direction from the write upper shield, forming a protective film above the read element, the write element, the write upper shield, the first resistance detecting element, the second resistance detecting element, and the third resistance detecting element, and coupling the write element, the read element, the first resistance detecting element, the second resistance detecting element, and the third resistance detecting element to terminals which are positioned on an end surface of the magnetic head.

Figure 1:
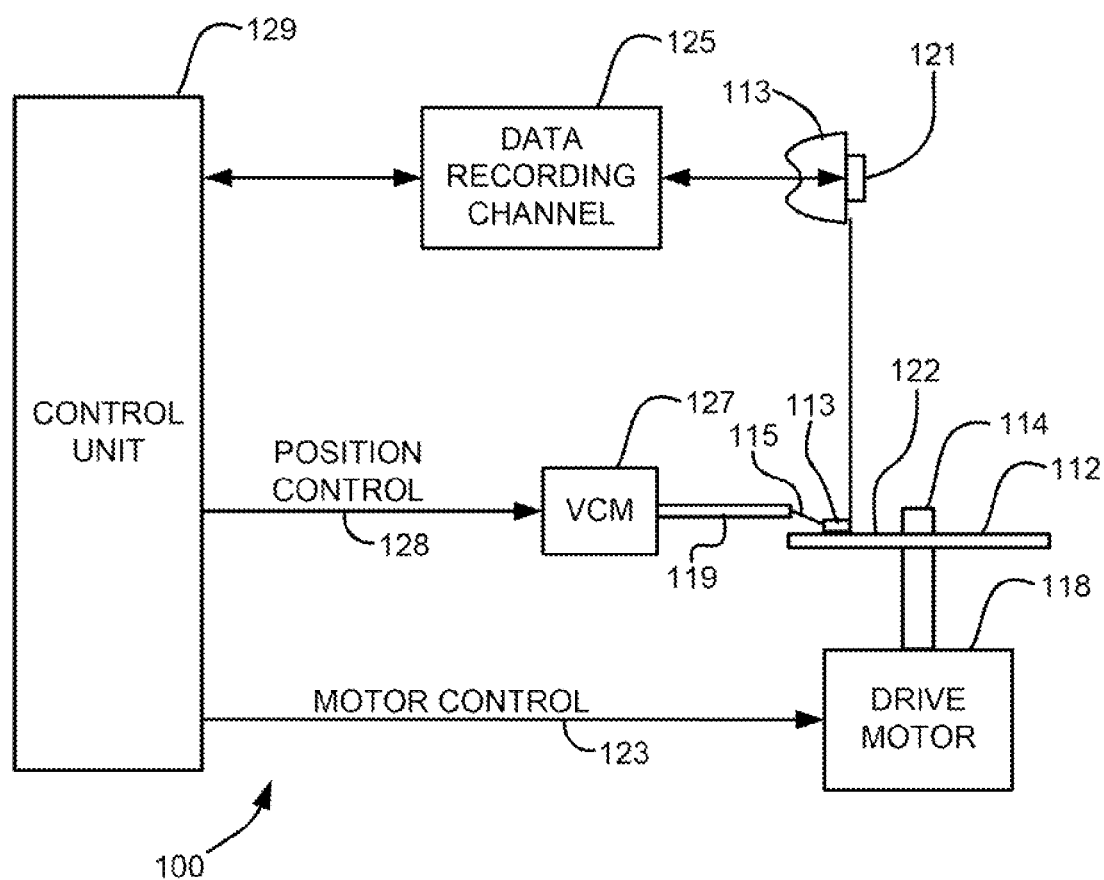
FIG. 1 is a simplified drawing of a magnetic recording disk drive system.
Figure 5:
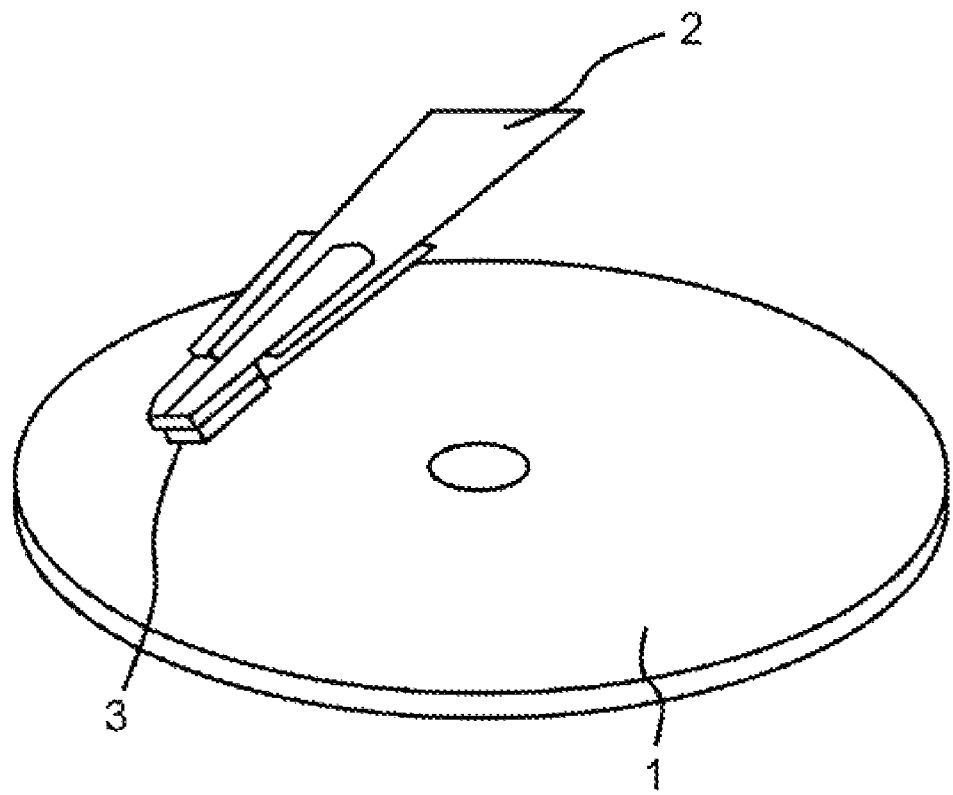
FIG. 5 shows a schematic view of a magnetic disk device, according to the prior art.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 using a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under-layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "intermediate layer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

Perpendicular magnetic recording methods are being developed and implemented to replace conventional in-plane magnetic recording methods as the preferred recording method of a magnetic head slider for higher density recording on HDDs as described previously. Because the perpendicular magnetic recording method has a narrower tip on the write element to concentrate magnetic flux, and the magnetic recording width on the magnetic disk changes in response to the element height of the narrowed tip, forming the element height of the write element with high precision becomes a problem when attempting to improve the yield. A conventional technique contributed to raising the yield to a high level by measuring the resistances of the resistance detecting elements formed on the same plane in the vicinities of the read element and the write element of the magnetic head slider during the polishing step of the air bearing surface of the magnetic head slider, and correcting the position offset precision of the read element and the write element to a high degree of precision followed by processing. However, the precision of the position offset detection for the conventional read element and write element must be further improved to about 10 nm.

One advantage of embodiments described herein is to solve the problem described above and to provide a magnetic head slider capable of detecting the position offsets of the read element and write element with high precision in the ABS finishing process of the magnetic head slider, and a method for manufacturing the slider.

To achieve the above advantage, a magnetic head slider in one embodiment may have at least three resistance detecting elements in the short axis direction of the magnetic head slider. In addition, one of the resistance detecting elements is the resistance detecting element formed to calculate the element height of the read element. The remaining two resistance detecting elements are the resistance detecting elements formed to calculate the element height of the write element. Furthermore, one of the resistance detecting elements for detecting the element height of the write element is formed near the write upper shield or is replaced by a flying height detecting element. In addition, in order to measure the resistance of each resistance detecting element described above, gold terminals for resistance detection which are connected to each element are formed at the end surface of the magnetic head.

A method for manufacturing a magnetic head, according to one embodiment, comprises the following steps. Of course, more or less steps may be included in the method, according to various embodiments.

1) A step for forming a read element, a write element, a write upper shield, a heating element; a resistance detecting element near the read element, a resistance detecting element near the write element, a resistance detecting element near the write upper shield element, and a flying height detecting element on a wafer. The flying height detecting element includes a base material comprising $Al_2O_3$—TiC.

2) A step for forming terminals for the read element, for the write element, for the write upper shield, for the heating element, for the resistance detecting element near the read element, for the resistance detecting element near the write element, for the resistance detecting element near the write upper shield element, and for the flying height detecting element. The terminals may comprise any suitable material, such as gold, silver, platinum, copper, etc.

3) A step for cutting the wafer into row bars that connect more than ten magnetic heads together.

4) A step for polishing the ABS while a polishing jig holding a row bar is tilted in the direction of a short axis of the row bar so that the offsets of the read element and the write element are at a specified offset by using the element height information calculated from the resistance value of each resistance detecting element when the resistances of at least three resistance detecting elements are measured.

5) A step for forming an ABS rail on the surface which becomes the ABS of the magnetic head in order to aid the magnetic head in flying above a magnetic disk.

6) A step for dividing a row bar into individual magnetic heads.

Some embodiments may be applied to a magnetic head to improve the precision of the formation of the write element height and improve the electrical characteristic yield because the offset detection precision is improved over a conventional read element and write element.

Figure 6A:
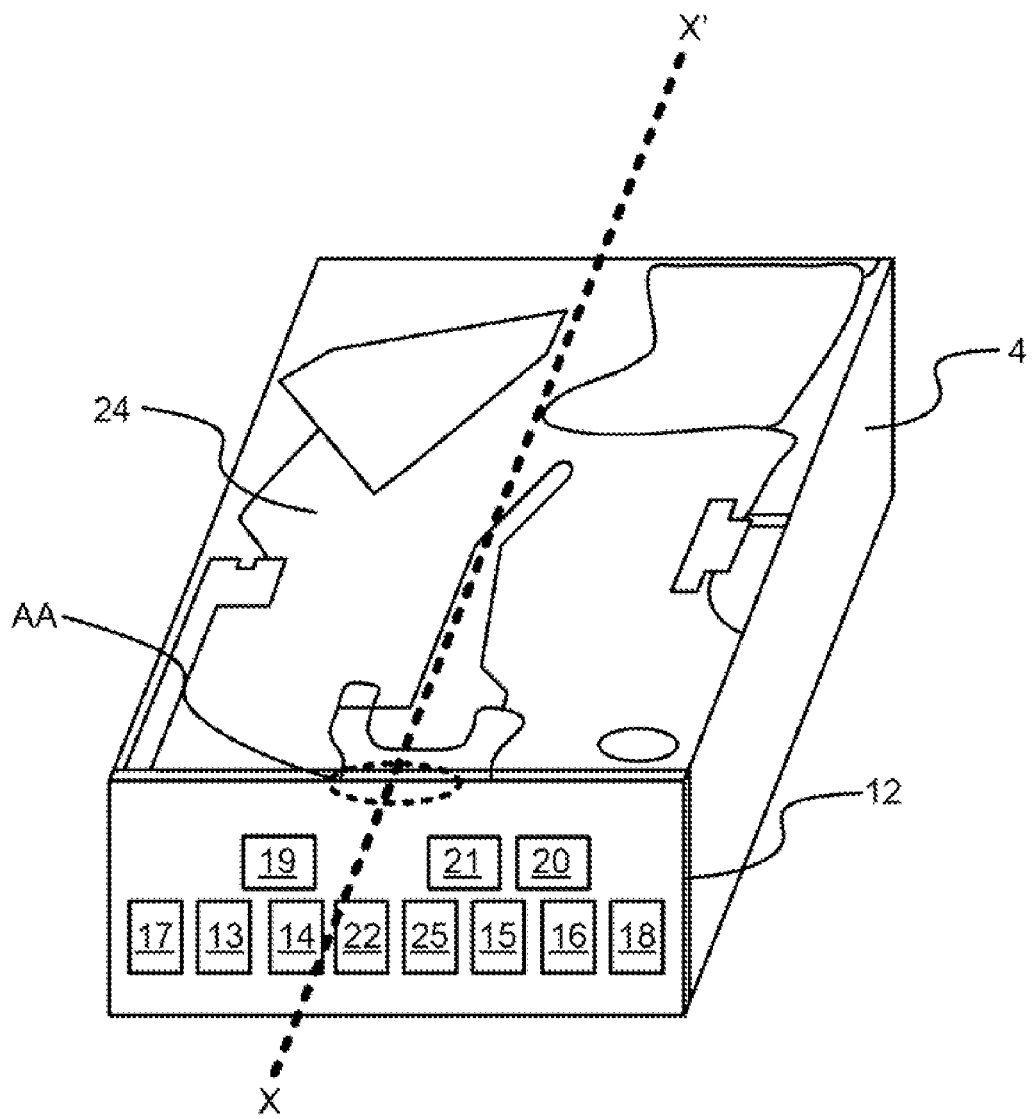
FIG. 6A shows a schematic view of a magnetic head, according to the prior art.
Figure 6C:
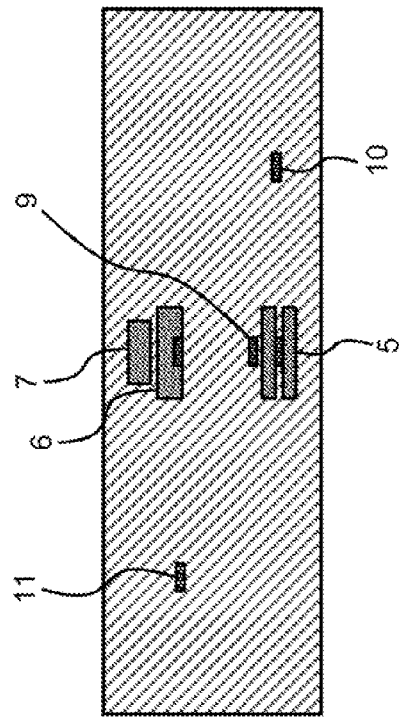
FIG. 6C shows an enlargement of an air bearing surface (ABS) of a magnetic head, according to the prior art.
Figure 6B:
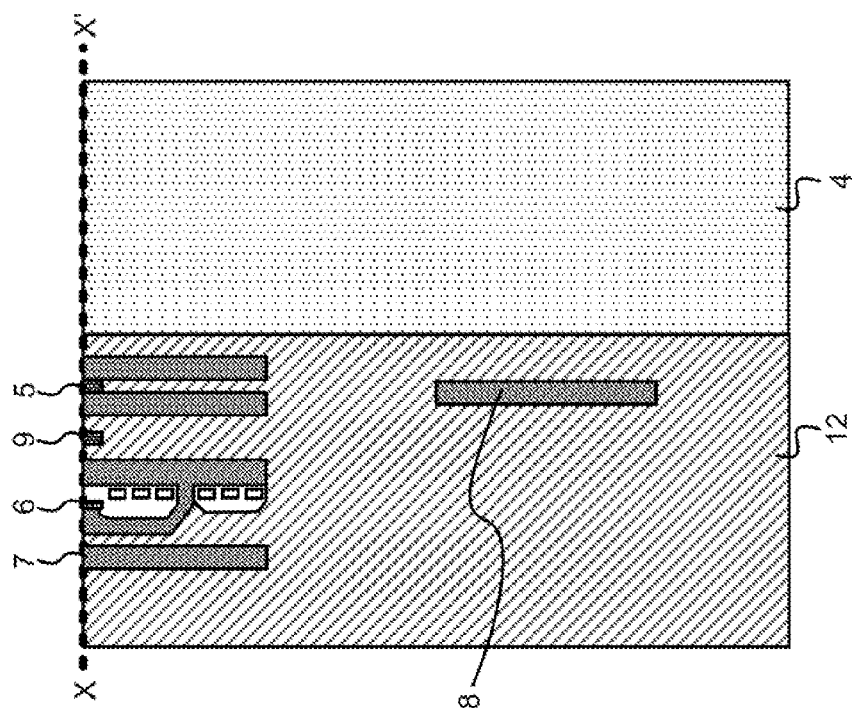
FIG. 6B shows a cross-sectional view of a magnetic head, according to the prior art.

FIG. 6A is a schematic view of a magnetic head according to the prior art. FIG. 6B is a cross-sectional view of a magnetic head according to the prior art. FIG. 6C is an enlarged view of an element member from the ABS of the magnetic head according to the prior art. As shown in FIG. 6A, the magnetic head is formed from a substrate 4 and a protective film 12 embedded with each element, which is explained in more detail later. In addition, an ABS rail 24 is formed by ion milling on the ABS so that the magnetic head in the HDD flies on the order of nanometers above the ABS, which is a surface of the magnetic head 3 that is opposite the magnetic disk. Gold terminals 13-23 are formed in the end surface of the magnetic head in order to measure the resistance value of each element embedded in the protective film 12. As shown in FIG. 6B and FIG. 6C, the magnetic head 3 comprises the read element 5, write element 6, write upper shield 7, heating element 8, and flying height detecting element 9 formed on the end surface of the substrate 4, which comprises $Al_2O_3$—TiC. In addition, the resistance detecting elements 10 and 11 used in the ABS finishing step are formed near the read element 5 and the write element 6. The protective film 12 which comprises alumina (e.g., $Al_2O_3$) is formed in order to protect all of the elements of the magnetic head 3. Each element is connected to a pair of gold terminals 13-23. The gold terminals for the read element 5 are 13 and 14. The gold terminals for the write element 6 are 15 and 16. The gold terminals for the heating element 8 are 17 and 18. The gold terminals for the resistance detecting element 10 near the read element are 19 and 20. The gold terminals for the resistance detecting element 11 near the write element are 19 and 21. The gold terminals for the flying height detecting element 9 are 22 and 23.

With continued reference to FIGS. 6A-6C, in the conventional technology, a method for manufacturing a magnetic head includes the following steps.

1) A read element 5, a write element 6, a write upper shield 7, a heating element 8, a flying height detecting element 9, a resistance detecting element 10 near the read element 5, and a resistance detecting element 11 near the write element 6 are formed on a substrate 4 that has about a 5-inch diameter and typically comprises $Al_2O_3$—TiC by using a thin-film process, such as plating, sputtering, polishing, etc.

2) The protective film 12, which typically comprises alumina, is formed by sputtering to cover the elements described above.

3) Optionally, through holes may be formed in the protective film 12. The protective film may have the through holes formed therethrough for allowing coupling of the terminals to the write element, the read element, the first resistance detecting element, the second resistance detecting element, and the third resistance detecting element. Each element and the gold terminals may be connected by at least one of Au, Ag, Cu, NiFe, etc., using the through holes or some other path of connection.

4) The substrate 4 is cut into row bars that align several tens of magnetic heads by using a cutting process, such as by using a cutting wheel.

5) A process is conducted to coarsely polish the ABS of the row bar which is the surface opposite the magnetic disk. This step determines the offsets of the read element 5 and the write element 6 in the direction opposite the magnetic disk. Specifically, gold terminals 19 and 20 for the resistance detecting element 10 near the read element 5 and the gold terminals 19 and 21 for the resistance detecting element 11 near the write element 6 are connected to the resistance detecting board of a polishing device by extremely fine gold wires having a diameter of about 30 μm. During the polishing process, after the resistance value of the resistance detecting element 10 near the read element and the resistance value of the resistance detecting element 11 near the write element were measured in the process, and the resistance value was converted to the respective element height, the offsets of the read element 5 and the write element 6 are calculated. Polishing is conducted by providing the angle in the direction of the short axis of the row bar so that the average value of the offsets of the read element 5 and the write element 6 of each detection slider in the row bar becomes the desired offset.

6) A final finishing and polishing process is applied to the ABS, which is the surface of the row bar opposite the magnetic disk. This step determines the element height of the read element 5. Specifically, the gold terminals 19 and 20 of the resistance detecting element 10 for the read element 5 are connected by extremely fine gold wires having a diameter of 30 gm to the resistance detecting board of the polishing device. During the polishing process, after the resistance of the resistance detecting element 10 is measured in the process, and the resistance value is converted to the element height, the polishing pressure applied to the row bar is partially controlled so that the element height of each element in a row bar becomes constant.

7) An ABS rail 24 is formed by ion milling on the ABS of the row bar in order for the magnetic head in the HDD to fly on the order of nanometers above the surface.

8) A cutting process is used to divide the row bar into individual magnetic heads.

Figure 7A:
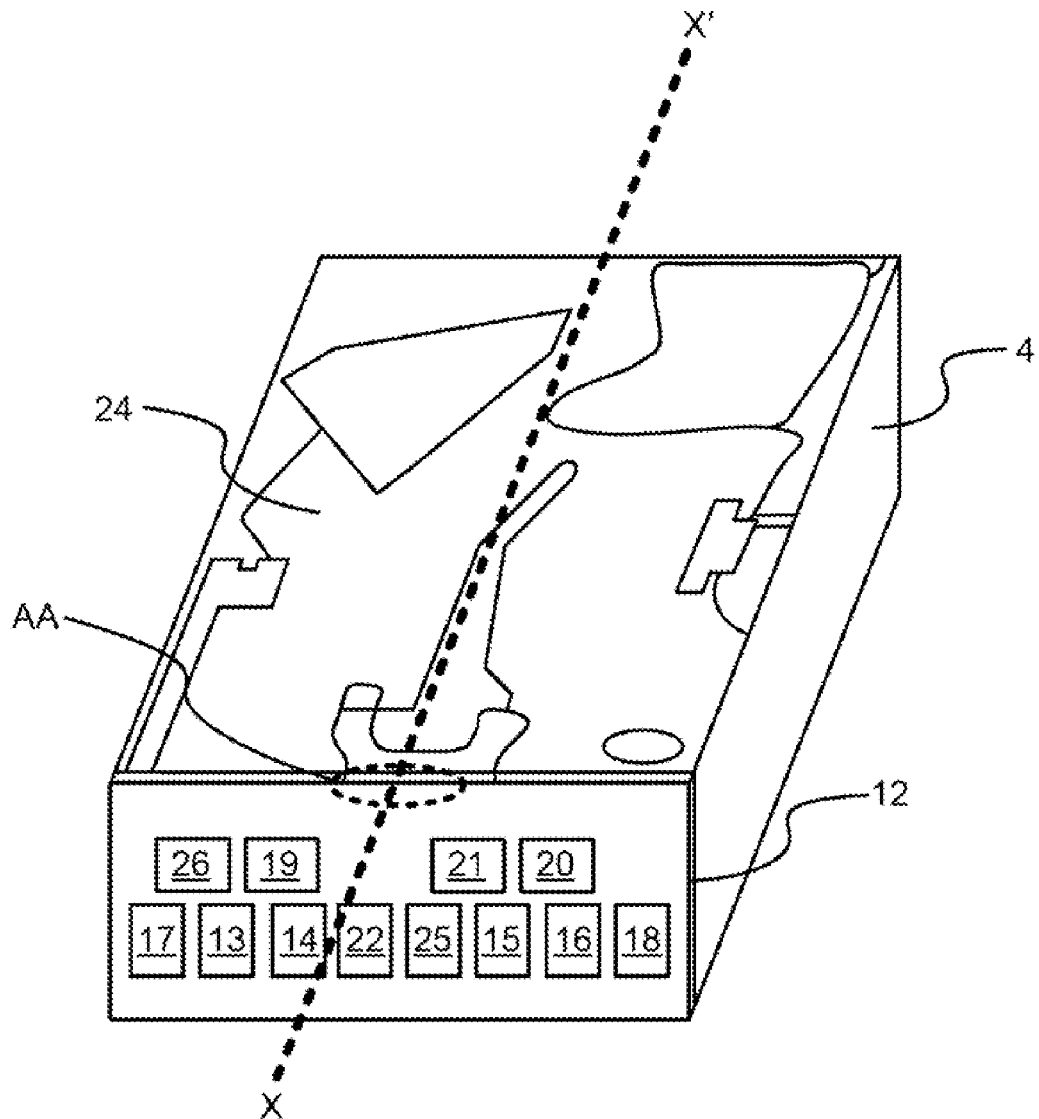
FIG. 7A shows a schematic view of a magnetic head, according to one embodiment.

Next, a first embodiment is explained with reference to FIGS. 7A-7C. As shown, similar to conventional methods and technology, the read element 5 and the resistance detecting element 10 near the read element 5 are formed on the same plane, the write element 6 and the resistance detecting element 11 near the write element 6 are formed on the same plane, the write upper shield 7 and the resistance detecting element 25 near the write upper shield 7 are formed on the same plane, the heating element 8, and the flying height detecting element 9 are stacked in the element part on the side surfaces of the magnetic head.

In one embodiment, each element is connected to the gold terminals 13-23 and 26 on the side surfaces of the magnetic head by wires, possibly utilizing the through holes. According to the first embodiment, as shown in FIG. 7A, the read element 5 is connected to terminals 13 and 14, which may comprise gold, silver, platinum, copper, etc., as would be known to one of skill in the art. Throughout this description, the terminals are described as gold, but this in no way limits the terminals from comprising a different suitable material, in addition to or in place of gold. The write element 6 is connected to gold terminals 15 and 16. The heating element 8 is connected to gold terminals 17 and 18. The resistance detecting element 10 for the read element 5 is connected to gold terminals 19 and 20. The resistance detecting element 11 for the write element 6 is connected to gold terminals 19 and 21. The flying height detecting element 9 is connected to gold terminals 22 and 23. The resistance detecting element 11 of the write upper shield 7 is connected to gold terminals 19 and 26.

Figure 7C:
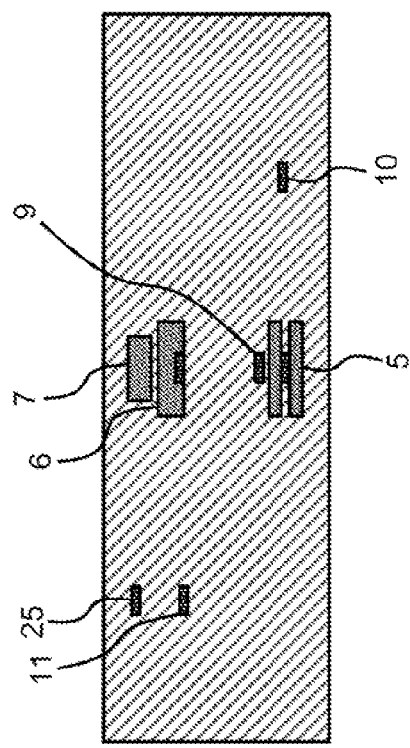
FIG. 7C shows an enlargement of an air bearing surface (ABS) of a magnetic head, according to one embodiment.
Figure 7B:
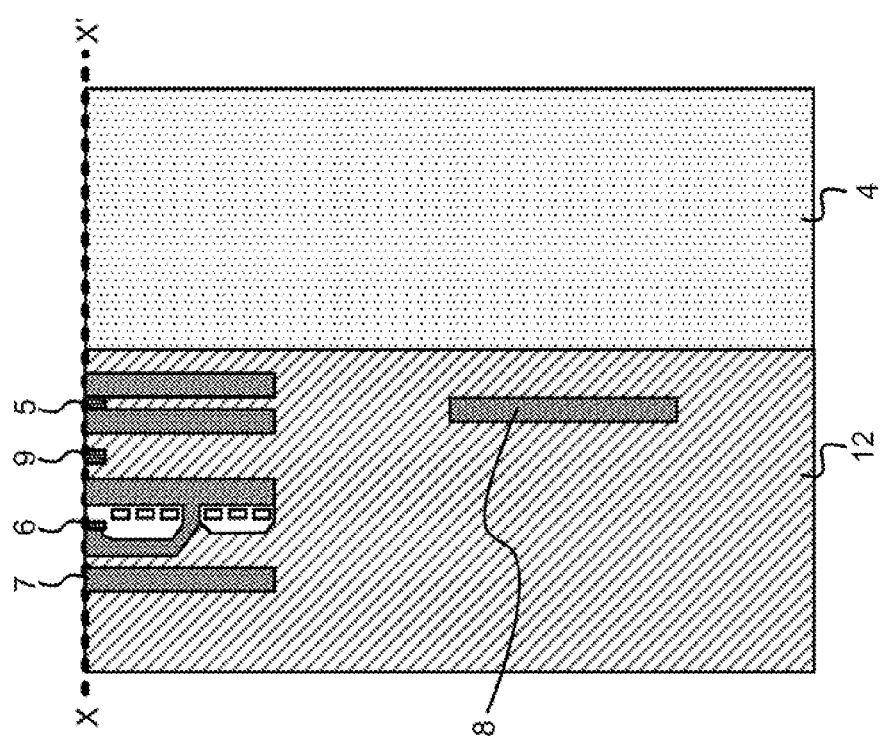
FIG. 7B shows a cross-sectional view of a magnetic head, according to one embodiment.

In addition, as shown in FIG. 7C, in one embodiment, the resistance detecting element 11 near the write element 6 and the resistance detecting element 25 near the write upper shield 7 are arranged on the same side with respect to the read element 5 and the write element 6. Furthermore, in one approach, the distance between the read element 5 and the resistance detecting element 10 near the read element 5, the distance between the write element 6 and the resistance detecting element 11 near the write element 6, and the distance between the write upper shield 7 and the resistance detecting element 25 near the write upper shield 7 are desired to be as short as possible.

Figure 8:
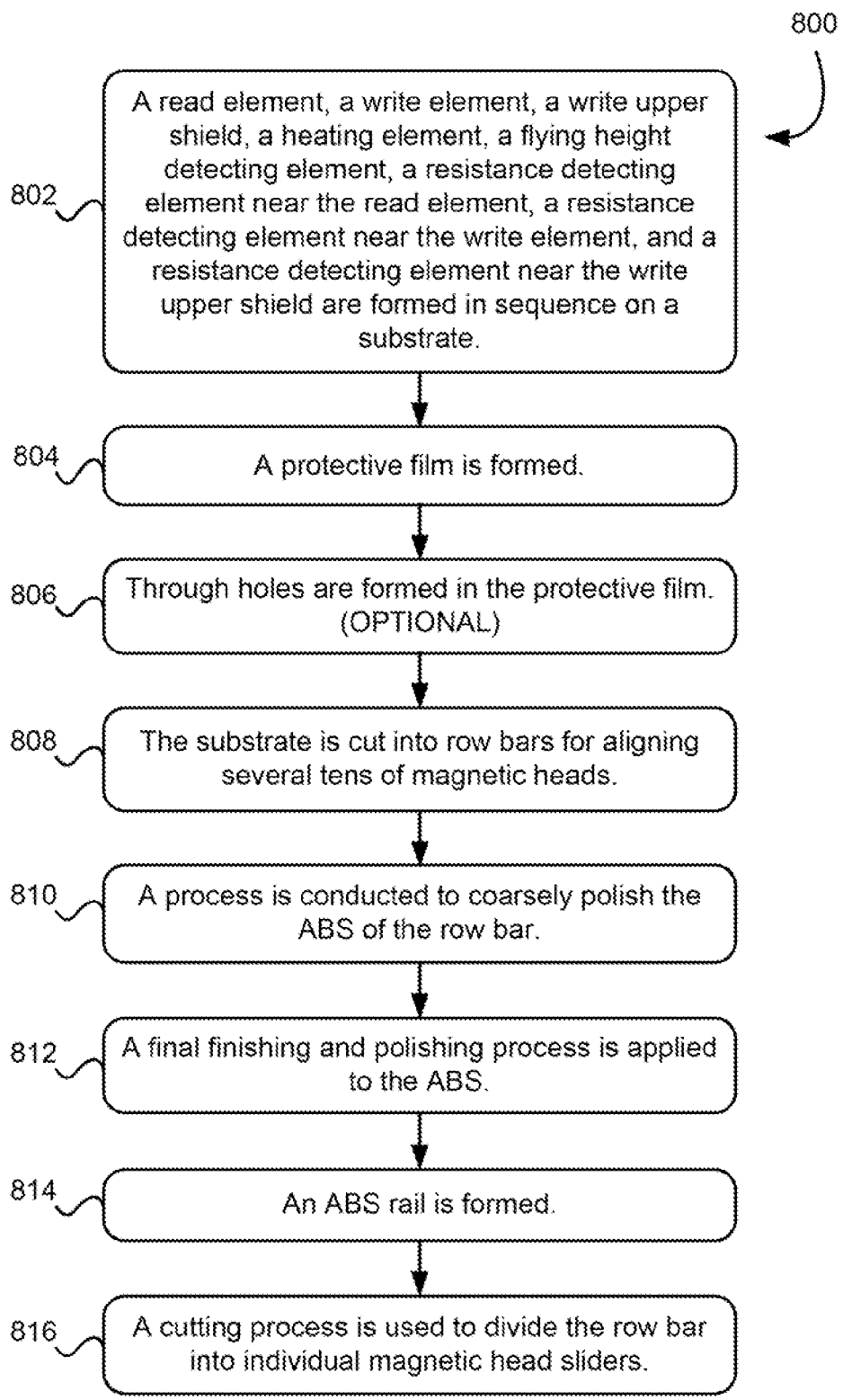
FIG. 8 shows a flowchart of a method, according to one embodiment.

Now referring to FIG. 8, a method 800 for forming a magnetic head is shown according to one embodiment. The method 800 may be carried out in any desired environment, and may include more or less operations than those described herein, according to various embodiments. The method 800 will be described with respect to elements shown in FIGS. 7A-7C, which together with FIG. 8 help to describe the method 800.

In operation 802, a read element 5, a write element 6, a write upper shield 7, a heating element 8, a flying height detecting element 9, a resistance detecting element 10 near the read element 5, a resistance detecting element 11 near the write element 6, and a resistance detecting element 25 near the write upper shield 7 are formed in sequence on a substrate 4 that has about a 5-inch diameter and comprises a suitable material as would be known to one of skill in the art, such as $Al_2O_3$—TiC, possibly through a thin-film process, such as plating, sputtering, polishing, etc.

In operation 804, a protective film 12 is formed, possibly using sputtering, to completely cover the read element 5, write element 6, write upper shield 7, heating element 8, flying height detecting element 9, resistance detecting element 10 near the read element 5, resistance detecting element 11 near the write element 6, and resistance detecting element 25 near the write upper shield 7. The protective film 12, according to one approach, may comprise alumina or any other suitable material, as would be understood by one of skill in the art.

In optional operation 806, through holes may be formed in the protective film 12, through which each element and the gold terminals may be connected by a suitable conductive material, such as gold, silver, copper, NiFe, platinum, etc., as would be known by one of skill in the art.

In operation 808, the substrate 4 is cut into row bars for aligning several tens of magnetic heads, such as by using a cutting process and a cutting wheel, in one approach. Of course, any other suitable method may be used, as would be known to one of skill in the art.

In operation 810, a process is conducted to coarsely polish the ABS of the row bar, which is the surface opposite the magnetic disk. This operation determines the offsets of the read element 5 and the write element 6 in the direction opposite the magnetic disk. Specifically, gold terminals 19 and 20 for the resistance detecting element 10 near the read element 5, the gold terminals 19 and 21 for the resistance detecting element 11 near the write element 6, and the gold terminals 19 and 26 for the resistance detecting element 25 near the write upper shield 7 are connected to the resistance detecting board of the polishing device by fine gold wires or other suitable conductors. Each wire may have a diameter of about 30 μm, in one approach.

During the polishing process, after the resistance values of the resistance detecting elements 10, 11, and 25 are measured in the process, and the resistance value is converted to a respective element height, the offsets of the read element 5 and the write element 6 may be calculated using a calculation method, which is described later. The polishing is conducted by providing the angle in the direction of the short axis of the row bar so that the average value of the offsets of the read element 5 and the write element 6 of each detection slider in the row bar becomes the desired offset.

In operation 812, a final finishing and polishing process is applied to the ABS. This operation determines the element height of the read element 5. Specifically, the gold terminals 19 and 20 of the resistance detecting element 10 for the read element 5 are connected, such as by using extremely fine gold wires, each wire having a diameter of 30 μm in one approach, to the resistance detecting board of the polishing device. During the polishing process, after the resistance of the resistance detecting element 10, 11, and 25 is measured in the process, and the resistance value is converted into an element height, the polishing pressure applied to the row bar is partially controlled so that the element height of each element of the row bar is made to be constant.

In operation 814, an ABS rail 24 is formed, such as through ion milling in one approach, on the ABS of the row bar in order for the magnetic head in the HDD to fly at a distance of several nanometers above the magnetic disk.

In operation 816, a cutting process is used to divide the row bar into individual magnetic head sliders.

In operation 808, the offset error between the read element 5 and the write element 6 are detected.

Figure 9:
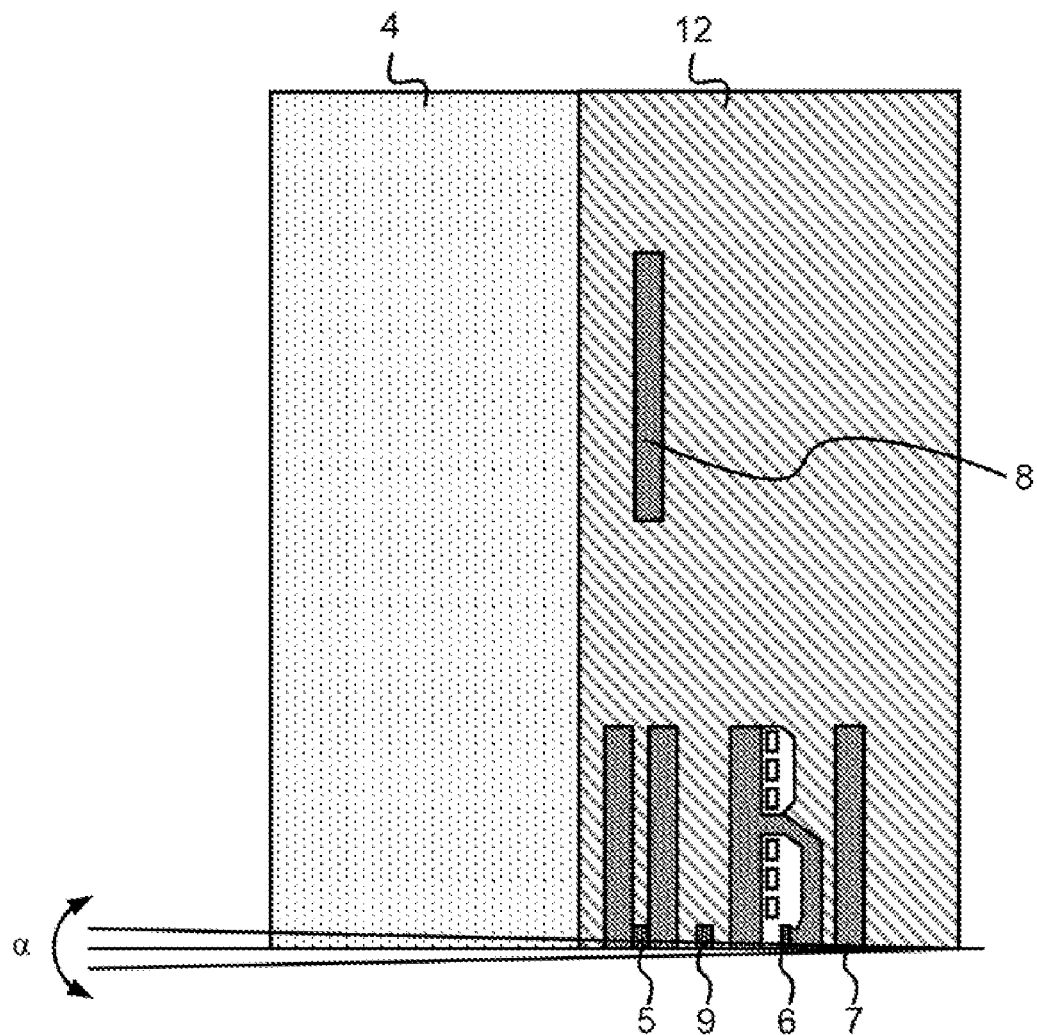
FIG. 9 shows angle correction during an ABS polishing operation, according one embodiment.

As shown in FIG. 9, the angle α may be given in the direction of the short axis of the row bar and is corrected, in one approach, based on the offset error determined between the read element 5 and the write element 6, in one approach.

Referring again to FIGS. 7A-7C, in the conventional technology, the offsets of the read element 5 and the write element 6 are determined by the following method. The resistance value-element height conversion coefficients determined in advance from the resistance value of the resistance detecting element 10 near the read element 5 and the resistance value of the resistance detecting element 11 near the write element 6, which were measured in process, are used to convert each resistance value to an element height. The difference between the values is calculated as the offset error. In the first embodiment, similar to the conventional technology, in addition to the offset error as calculated from the resistance values of the resistance detecting element 10 and the resistance detecting element 11, a new offset error b is calculated from the difference between the element height calculated from the resistance value of the resistance detecting element 25 formed near the write upper shield 7 and the element height calculated from the resistance detecting element 10. In this embodiment, when the read element 5 is set as the origin, the write element 6 is formed at a position separated by about 5200 nm in the direction of the film thickness. The write upper shield 7 is formed at a position separated by about 7200 nm. Of course, other dimensions may be used, as would be understood by one of skill in the art, which may depend on size, structure, function, etc., of the magnetic head.

Figure 10:
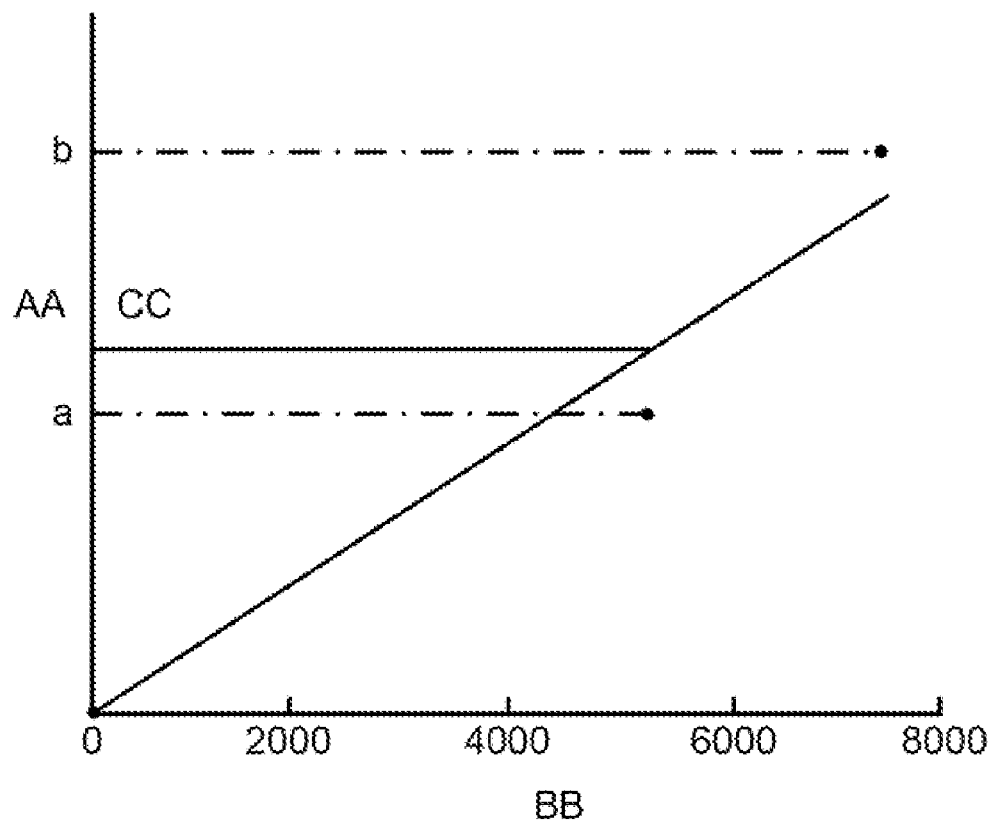
FIG. 10 shows a method for determining offset using least squares mean, according to one embodiment.

As shown in FIG. 10, a distance from the read element is plotted on the horizontal axis, and the offset errors a and b are plotted on the vertical axis. The offset error at 5200 nm, which is the write element position, is calculated from the approximate line calculated by the method of least squares, in one approach. Other suitable methods of calculating the write element position may also be used, as would be understood by one of skill in the art.

Referring again to FIGS. 7A-7C, by calculating one offset error from the resistance detecting elements at three locations, the offset calculation precision is improved over the conventional technology that calculates the offset error from the resistance detecting elements at two locations. In this embodiment, the offset error of the write element 6 is calculated by the method of least squares. However, the average value of the correction angle determined from the offset errors of the resistance detecting element 10 and the resistance detecting element 11, the correction angle determined from the offset errors of the resistance detecting element 10 and the resistance detecting element 25, and the correction angle determined from the offset errors of the resistance detecting element 11 and the resistance detecting element 25 may be calculated as the control angle.

Figure 11A:
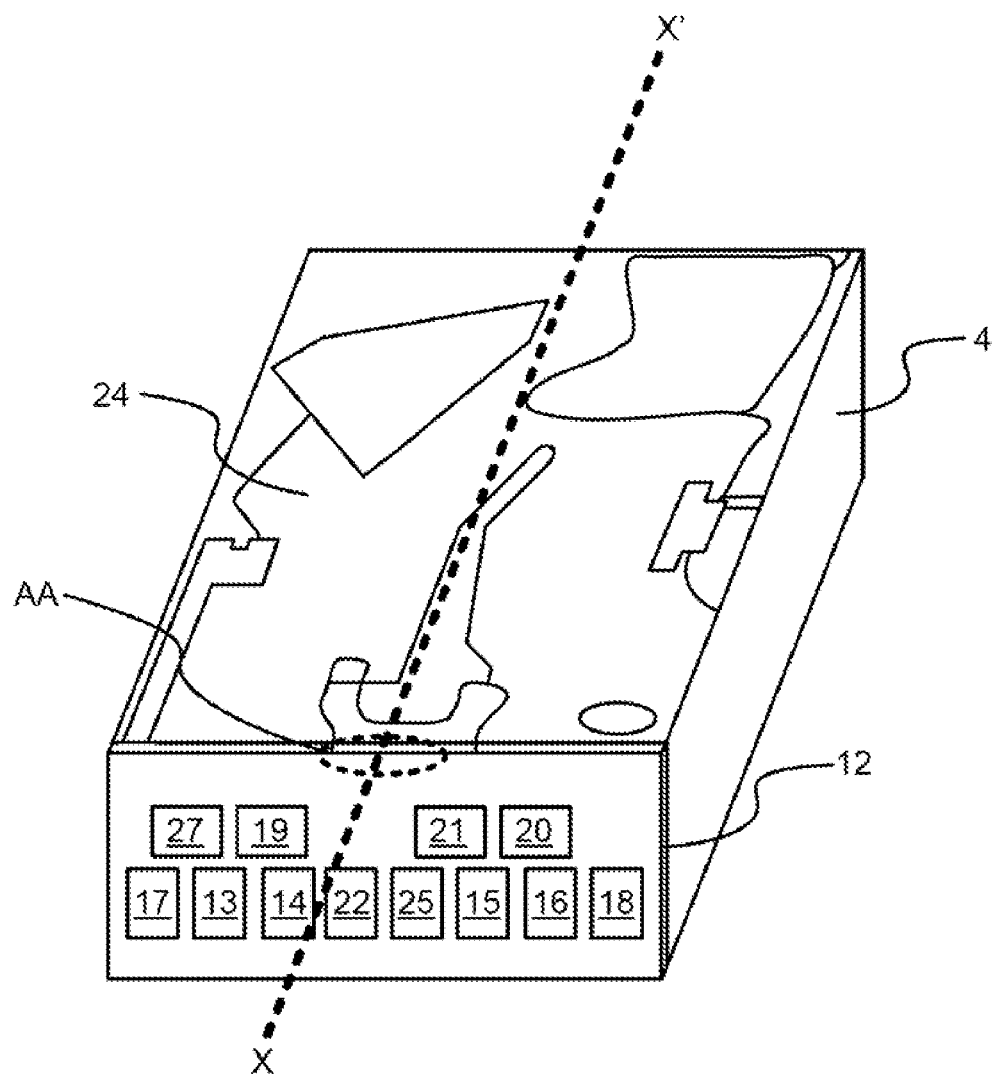
FIG. 11A shows a schematic view of a magnetic head, according to one embodiment.
Figure 11C:
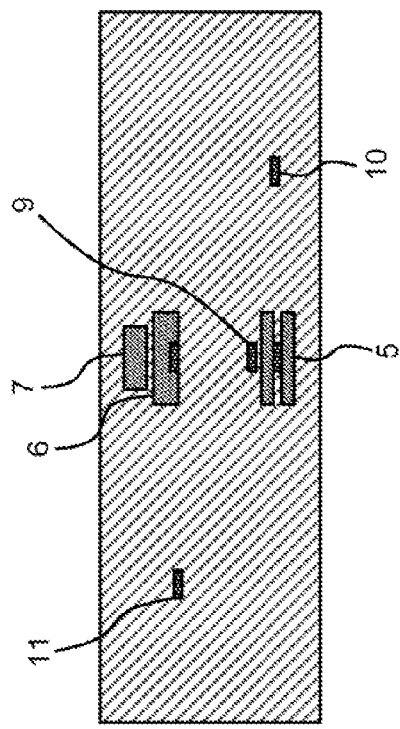
FIG. 11C shows an enlargement of an air bearing surface (ABS) of a magnetic head, according to one embodiment.
Figure 11B:
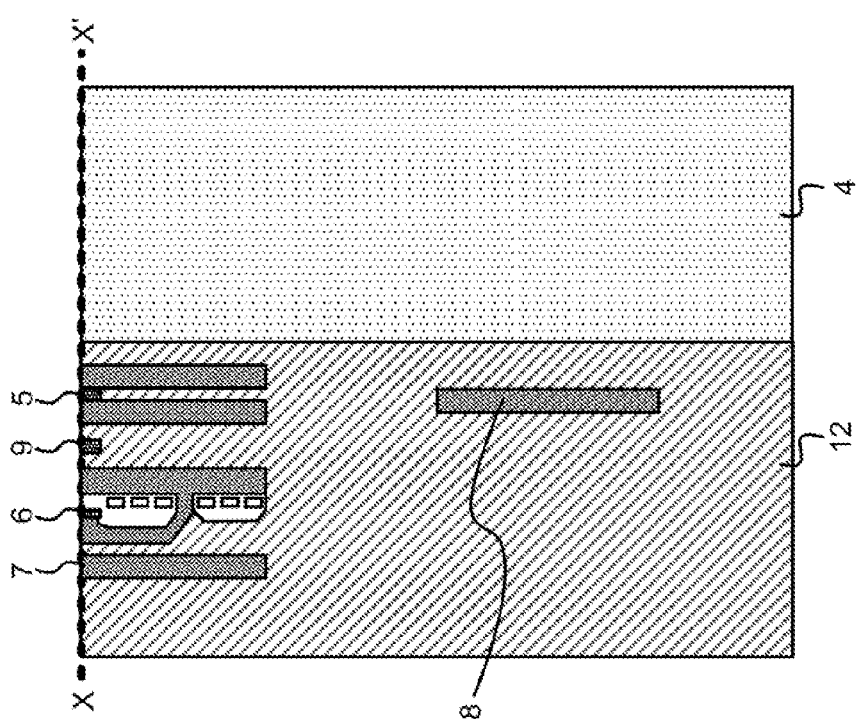
FIG. 11B shows a cross-sectional view of a magnetic head, according to one embodiment.

In a second embodiment, a method uses the flying height detecting element 9 in the calculation of the offset error instead of the resistance detecting element 25 described in the first embodiment. FIGS. 11A-11C show the details of the magnetic head, according to the second embodiment. As shown in FIGS. 11B-11C, similar to the conventional technology, the magnetic head 3 comprises a read element 5, a write element 6, a write upper shield 7, a heating element 8, a flying height detecting element 9 formed on the end surface of the substrate 4. The substrate may comprise $Al_2O_3$—TiC, in one approach.

The resistance detecting elements 10 and 11 used in the ABS polishing step may be formed near the read element 5 and the write element 6. As shown in FIG. 11A, read element 5 is connected to gold terminals 13 and 14. Write element 6 is connected to gold terminals 15 and 16. Heating element 8 is connected to gold terminals 17 and 18. Resistance detecting element 10 for the read element is connected to gold terminals 19 and 20. Resistance detecting element 11 for the write element is connected to gold terminals 19 and 21. Flying height detecting element 9 is connected to gold terminals 22 and 23 and gold terminals 19 and 27. The gold terminals 19 and 27 for use by the flying height detecting element 9 are the locations connected by extremely fine gold wires in order to measure the resistance of the flying height detecting element 9 in the ABS polishing step. If there are no problems in the process even when the gold wires are connected to the gold terminals 22 and 23, the flying height detecting element 9 and the gold terminals 19, 27 do not have to be wired.

A manufacturing method for forming a magnetic head, according to the second embodiment, is substantially the same as the method 800 as described in FIG. 8 for the first embodiment. Referring again to FIGS. 11A-11C, the calculation method of the offset error of the write element 6 is nearly identical to that in the first embodiment. Specifically, in addition to the offset error as calculated from the resistance values of the resistance detecting element 10 and the resistance detecting element 11, a new offset error b is calculated from the difference between the element height calculated from the resistance value of the flying height detecting element 9 and the element height calculated from the resistance detecting element 10. In this embodiment, when the read element 5 is assumed to be the origin, the write element 6 is formed at a position separated by 5200 nm in the direction of the film thickness. The flying height detecting element 9 is formed at a position separated by about 4200 nm in one approach. Of course other dimensions may be used, as would be known to one of skill in the art depending on the size, function, etc. of the magnetic head, such as 3800 nm, 4000 nm, 4500 nm, 4800 nm, 5500 nm, etc.

Similar to FIG. 9, with reference to FIGS. 11A-11C, the distance from the read element 5 is plotted on the horizontal axis. The offset errors a, b are plotted on the vertical axis. The offset error at 5200 nm, which is the write element position, is calculated from the approximate line calculated by the least squares method. Similar to the first embodiment, the average of the correction angle determined from the offset error of the resistance detecting element 10 and the resistance detecting element 11, the correction angle determined from the offset error of the resistance detecting element 10 and the flying height detecting element 9, and the correction angle determined from the offset error of the resistance detecting element 11 and the flying height detecting element 9 may be calculated as the control angle.

Figure 12:
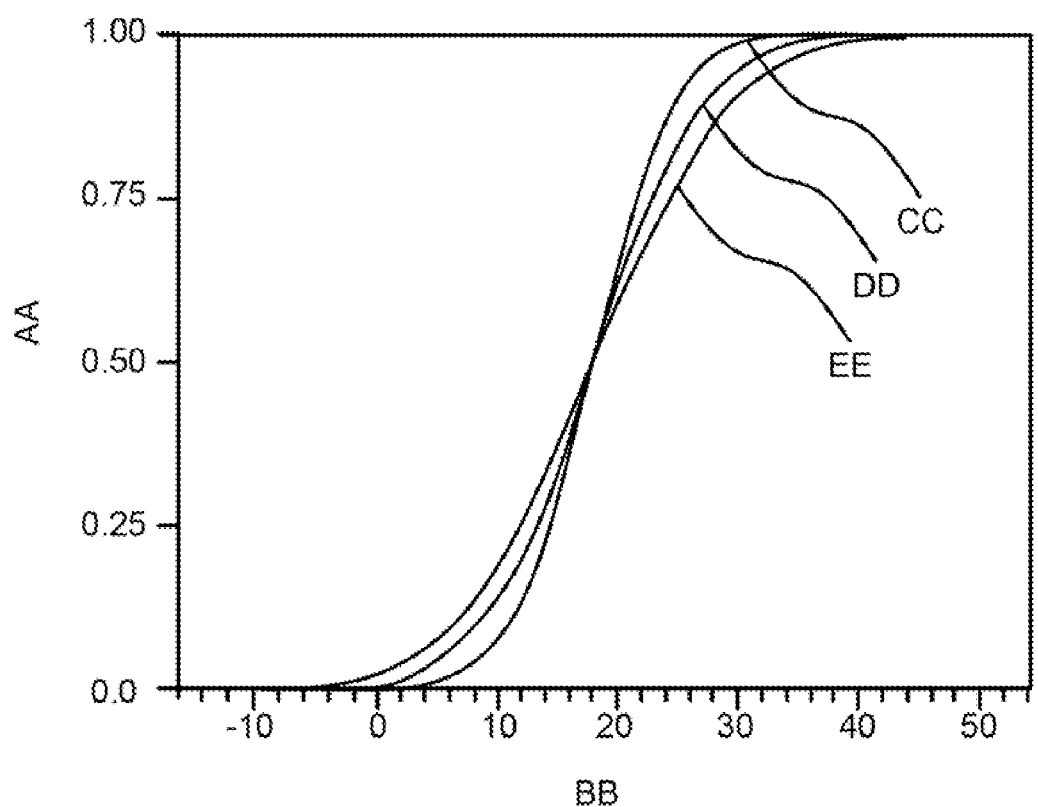
FIG. 12 is a graph comparing fluctuations in the offset error for the conventional technology and several embodiments.

FIG. 12 is a graph showing the fluctuations in the offset error determined from the approximate lines of the conventional technology, the first embodiment, and the second embodiment. When the resistance detecting element 25 formed in the same layer as the write upper shield described in the first embodiment is used to calculate the offset error, the calculation precision is improved from 9.1 nm to 5.4 nm. In addition, when the flying height detecting element 9 described in the second embodiment is used to calculate the offset error, the calculation precision is improved from 9.1 nm to 7.2 nm. By improving the precision, the fluctuations ($\sigma$) of the MCW decrease to 4 nm in the first embodiment and to 2 nm in the second embodiment.

Although the first and second embodiments have been described with some particularity herein, modifications, additional approaches, and/or adjustments may be made to either embodiment without varying the effectiveness of the magnetic head, as described herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a read element;
   a write element;
   a write upper shield positioned in a downtrack direction from the write element;
   a first resistance detecting element positioned on an air bearing surface (ABS) side in a first cross-track direction from the read element;
   a second resistance detecting element positioned on the ABS side in a second cross-track direction from the write element;
   a third resistance detecting element positioned on the ABS side in a third cross-track direction from the write upper shield;
   a protective film positioned near the read element, the write element, the write upper shield, the first resistance detecting element, the second resistance detecting element, and the third resistance detecting element; and
   terminals positioned on an end surface side of the magnetic head, the terminals being coupled to the write element, the read element, the first resistance detecting element, the second resistance detecting element, and the third resistance detecting element.

2. The magnetic head as recited in claim 1, further comprising a heating element and a flying height detecting element positioned on the ABS side.

3. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

4. The magnetic head as recited in claim 1, wherein the second and third cross-track directions are the same direction, and wherein the second and third resistance detecting elements are positioned an equal distance from a centerline of the read element in the cross-track direction.

5. The magnetic head as recited in claim 1, wherein the terminals are coupled to the write element, the read element, the first resistance detecting element, the second resistance detecting element, and the third resistance detecting element using fine gold wires having a diameter of about 30 µm.

6. The magnetic head as recited in claim 1, wherein the read element and the write element are coupled to a shared terminal.

7. The magnetic head as recited in claim 1, wherein the protective film has through holes therethrough adapted for allowing coupling of the terminals to the write element, the read element, the first resistance detecting element, the second resistance detecting element, and the third resistance detecting element.

8. A method for forming a magnetic head, the method comprising:
   forming a read element;
   forming a write element;
   forming a write upper shield;
   forming a first resistance detecting element near the read element in a first cross-track direction from the read element;
   forming a second resistance detecting element near the write element in a second cross-track direction from the write element;
   forming a third resistance detecting element near the write upper shield in a third cross-track direction from the write upper shield;
   forming a protective film above the read element, the write element, the write upper shield, the first resistance detecting element, the second resistance detecting element, and the third resistance detecting element; and
   coupling the write element, the read element, the first resistance detecting element, the second resistance detecting element, and the third resistance detecting element to terminals which are positioned on an end surface of the magnetic head.

9. The method as recited in claim 8, wherein the terminals are coupled to the write element, the read element, the first resistance detecting element, the second resistance detecting element, and the third resistance detecting element using fine gold wires having a diameter of about 30 µm.

10. The method as recited in claim 8, wherein the read element, the write element, the write upper shield, the first resistance detecting element, the second resistance detecting element, and the third resistance detecting element are formed in sequence above a substrate comprising $Al_2O_3$—TiC.

11. The method as recited in claim 10, further comprising:
   cutting the substrate into row bars for aligning a plurality of magnetic heads;
   coupling terminals for the first, second, and third resistance detecting elements to a resistance detecting board of a polishing device;
   polishing an air bearing surface (ABS) of each row bar using the polishing device in order to determine the offsets of the read element and the write element in a direction opposite the ABS;
   converting a resistance value obtained from the first, second, and third resistance detecting elements into a height of a respective element; and
   calculating offsets of the read element and the write element.

12. The method as recited in claim 1 further comprising finishing and polishing the ABS to produce an element height of the read element.

13. The method as recited in claim 8, further comprising:
   forming a heating element; and
   forming a flying height detecting element,
   wherein the heating element and the flying height detecting element are formed below the protective film.

14. The method as recited in claim 8, wherein the second and third cross-track directions are the same direction, and wherein the second and third resistance detecting elements are formed an equal distance from a centerline of the read element in the cross-track direction.

15. The method as recited in claim 8, wherein the read element and the write element are coupled to a shared terminal.

16. The method as recited in claim 8, wherein calculating the offset of the write element comprises method of least squares.

17. The method as recited in claim 8, further comprising forming through holes in the protective film adapted for coupling the write element, the read element, the first resistance detecting element, the second resistance detecting element, and the third resistance detecting element to the terminals.

* * * * *

UNITED STATES PATENT AND TRADEMARK OFFICE
CERTIFICATE OF CORRECTION

PATENT NO. : 8,254,057 B1
APPLICATION NO. : 13/369199
DATED : August 28, 2012
INVENTOR(S) : Hattori et al.

Page 1 of 1

It is certified that error appears in the above-identified patent and that said Letters Patent is hereby corrected as shown below:

In the specification:

col. 9, line 7 replace "gm" with --µm--.

Signed and Sealed this
Sixth Day of November, 2012

David J. Kappos
*Director of the United States Patent and Trademark Office*